US008250493B2

(12) United States Patent  
Yang et al.

(10) Patent No.: US 8,250,493 B2
(45) Date of Patent: Aug. 21, 2012

(54) USER INTERFACE METHOD, MEDIUM, AND APPARATUS WITH GESTURE-RECOGNITION

(75) Inventors: Jing Yang, Yongin-si (KR); Dongyoon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 575 days.

(21) Appl. No.: 11/342,968

(22) Filed: Jan. 31, 2006

(65) Prior Publication Data

US 2006/0177112 A1 Aug. 10, 2006

(30) Foreign Application Priority Data

Feb. 5, 2005 (KR) .................. 10-2005-0010995
Apr. 13, 2005 (KR) .................. 10-2005-0030746

(51) Int. Cl.
*G06F 3/033* (2006.01)
(52) U.S. Cl. .................. 715/863; 715/710; 715/773
(58) Field of Classification Search .............. 715/763, 715/710, 773, 863
See application file for complete search history.

(56) References Cited

U.S. PATENT DOCUMENTS

| 4,351,600 | A | * | 9/1982 | Hasegawa et al. ............ 396/203 |
| 5,809,366 | A | * | 9/1998 | Yamakawa et al. ............ 399/39 |
| 5,889,236 | A | * | 3/1999 | Gillespie et al. ............ 178/18.01 |
| 6,246,411 | B1 | * | 6/2001 | Strauss ............ 715/863 |
| 6,249,606 | B1 | * | 6/2001 | Kiraly et al. ............ 382/195 |
| 6,369,794 | B1 | | 4/2002 | Sakurai et al. |
| 6,583,781 | B1 | | 6/2003 | Joshi et al. |
| 6,850,221 | B1 | * | 2/2005 | Tickle ............ 345/158 |
| 6,908,386 | B2 | * | 6/2005 | Suzuki et al. ............ 463/30 |
| 2004/0034505 | A1 | | 2/2004 | Kimble |
| 2004/0140984 | A1 | | 7/2004 | Hinckley et al. |
| 2006/0055662 | A1 | * | 3/2006 | Rimas-Ribikauskas et al. ............ 345/156 |

FOREIGN PATENT DOCUMENTS

| KR | 10-2001-0017203 | 3/2001 |
| WO | WO 98/33141 | 7/1998 |

OTHER PUBLICATIONS

Extended European Search Report dated Oct. 25, 2006 in corresponding European patent application No. 06250568.0.
Korean Office Action dated Jul. 28, 2006 in Korean Patent Application 10-2005-0030746.

\* cited by examiner

*Primary Examiner* — Sara England
(74) *Attorney, Agent, or Firm* — Staas & Halsey LLP

(57) ABSTRACT

A user interface method, medium, and apparatus with gesture-recognition. The user interface method may include measuring acceleration of a gesture-recognition based input device while a writing gesture is performed, e.g., in the air, using the gesture-recognition based input device to generate acceleration signals, and determining whether the gesture-recognition based input device is operated in a predetermined gesture range from a time period when the writing gesture is made, or the acceleration signals, to generate warnings when the gesture-recognition based input device deviates the predetermined gesture range.

20 Claims, 9 Drawing Sheets

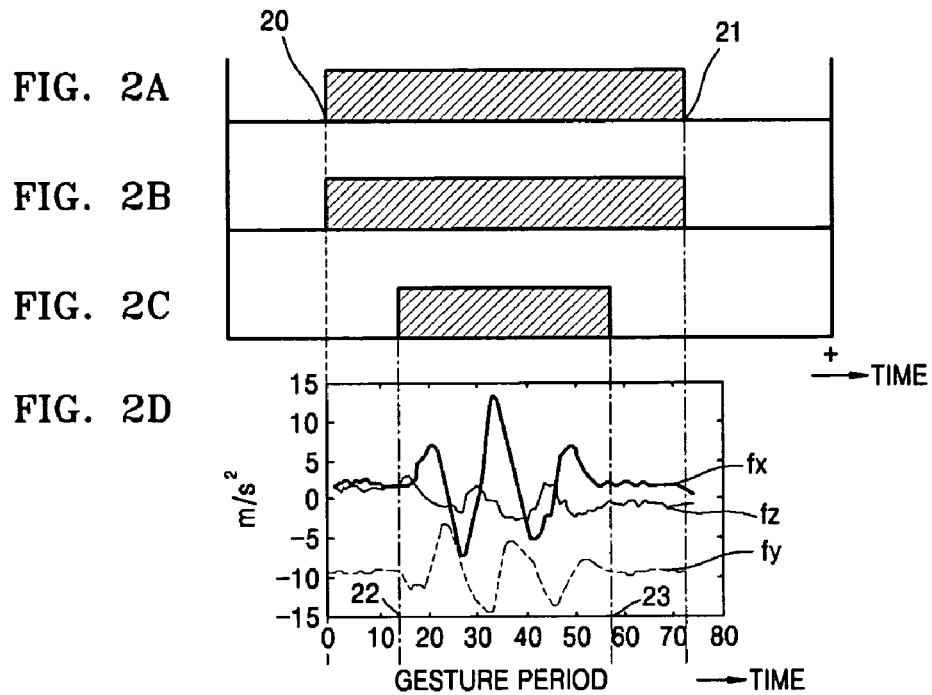
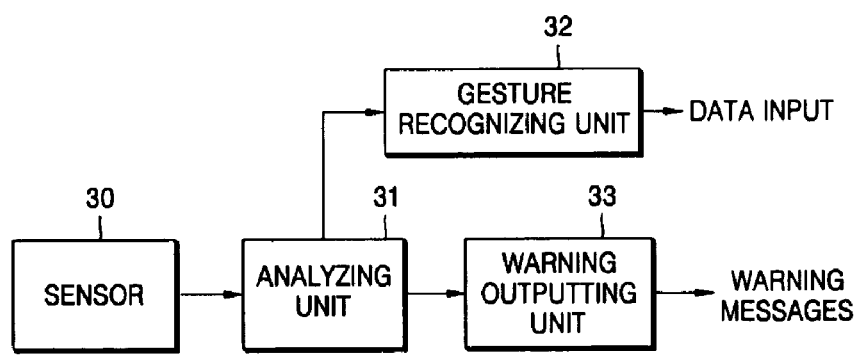

USER INTERFACE METHOD, MEDIUM, AND APPARATUS WITH GESTURE-RECOGNITION

CROSS-REFERENCE TO RELATED APPLICATIONS

Embodiments of this application claims the priority benefit of Korean Patent Application Nos. 10-2005-0010995, filed on Feb. 5, 2005, and 10-2005-0030746, filed on Apr. 13, 2005, in the Korean Intellectual Property Office, the disclosure of which is incorporated herein in its entirety by reference.

BACKGROUND OF THE INVENTION

1. Field of the Invention

Embodiments of the present invention, as discussed herein, relate to a user interface method, medium, and apparatus with gesture-recognition, and more particularly, for example, to a user interface method, medium, and apparatus capable of informing a user when a gesture-recognition based input device is not operated properly.

2. Description of the Related Art

A gesture-recognition based input device may recognize the writing gesture of a user to determine contents intended by the user, such as characters, numbers, and alternate gesture contents. In other conventional input devices, such as buttons and keyboards of smart apparatuses, users are required to understand functions and button arrangements of the input devices. In addition, in these systems, the users are required to fix their eyes on buttons in order to find associated buttons. Whereas, in a gesture-recognition based input device, a user need not understand functions and button arrangements of input devices. Therefore, alternatively from conventional input devices, in the gesture-recognition based input devices the user can freely input contents by making gestures without fixing his/her eyes on buttons.

However, according to such conventional gesture-recognition based input devices, the range of gestures are restricted due to the limitation of the sensing range of a corresponding sensor that senses the writing gesture of the user. Also, the quality of data sensed by the sensor for gesture recognition significantly affects the result of recognition. For example, when the gesture is too slow to be sensed by the sensor or when a significant amount of noise, e.g., caused by the trembling of a hand, is included in sensed signals, the recognition rate may deteriorate.

Therefore, it is desirable that when the writing gesture of the user who operates the gesture-recognition based input device deviates from a predetermined allowable range, the gesture-recognition based input device informs the user of the non-discernable nature of the gesture and to make a new proper gesture.

SUMMARY OF THE INVENTION

Embodiments of the present invention provide, at least herein, a user interface method, medium, and apparatus analyzing signals sensed by a gesture-recognition based input device to determine whether the gesture performed by a user is out of an allowable range and for generating warnings when the gesture is out of the allowable range so that the user can properly perform the gesture within the allowable range.

To achieve the above and/or other aspects and advantages, embodiments of the present invention include at least a user interface method, including measuring acceleration of an input device while a gesture writing is performed, using the input device to generate acceleration signals, determining whether the input device is operated relative to a predetermined gesture range based on a time period when the gesture writing is made and/or based on the acceleration signals, and generating a warning when the input device deviates from the predetermined gesture range.

The input device may be a gesture-recognition based input device.

In addition, the gesture writing may be made while a button of the input device is activated.

Here, the generating of the warning may include generating a warning that the button has been temporarily released from activation, when the button is deactivated and re-activated within a predetermined time during the gesture writing.

The predetermined gesture range may indicate that a sampling period, which represents a period when the button is activated, is no less than a first threshold value and no greater than a second threshold value.

The generating of the warning may include a warning against a short input writing gesture, when the sampling period is less than the first threshold value, and another warning against a slow or small input writing gesture, when the sampling period is greater than the second threshold value.

The predetermined gesture range may indicate that a gesture period, which represents a period when corresponding acceleration is measured, is no less than a first threshold value and no greater than a second threshold value.

The generating of the warning may include a warning against a short input writing gesture, when the gesture period is less than the first threshold value, and another warning against a slow or small input writing gesture, when the gesture period is greater than the second threshold value.

When a maximum value of variances of the acceleration signals is less than a third threshold value during the gesture period or when a maximum value of acceleration variances detected by a moving window during the gesture period is less than a fourth threshold value, and the magnitudes of the acceleration signals are less than a magnitude of acceleration noise, the gesture writing may be determined to be outside of the predetermined range.

Here, the input device may generate a warning against a slow or small input writing gesture.

The predetermined gesture range may indicate that a pitch angle and/or a roll angle, which correspond to a pose of the input device with respect to a bottom plane on which the input device is positioned, are in predetermined angle ranges.

The pitch angle and/or the roll angle may be measured from an average of three-axis acceleration data sampled during a period when corresponding acceleration is measured.

When the pitch angle and/or the roll angle deviate from the angle ranges, a warning signal is generated to request the pose of the gesture-recognition based input device be corrected.

To achieve the above and/or other aspects and advantages, embodiments of the present invention include at least a user interface apparatus for an input device to recognize a gesture writing, the apparatus including a sensor to measure acceleration of the gesture writing to generate an acceleration signal, an analyzing unit to determine whether the input device is operated within a predetermined gesture range, based on a period when the writing gesture is made or the acceleration signal, and to generate a warning signal when the input device is operated outside of the predetermined gesture range.

The input device may be a gesture-recognition based input device.

The apparatus may further include a button continuously activatable when the gesture writing is made.

Here, the analyzing unit may output the warning signal indicating when the button has temporarily been released, when the button is deactivated and re-activated within a predetermined time during the gesture period.

The analyzing unit may output a warning signal against a short input gesture writing when a sampling period, which represents a period when the button is activated, is less than a first threshold value, and output another warning signal against a slow or small input gesture writing when the sampling period is greater than a second threshold value.

Further, the analyzing unit may output a warning signal against a short input gesture writing when a gesture period, which is a period when the acceleration is measured to be less than a first threshold value, and output another warning signal against a slow or small input gesture writing when the gesture period is less than a second threshold value.

Here, the analyzing unit may output the other warning signal against the slow or small input gesture writing when a maximum value of variances of acceleration signals during the gesture period is less than a third threshold value or a maximum value of acceleration variances, detected by a moving window in the gesture period, is less than a fourth threshold value and the magnitudes of the acceleration signals during the gesture period are less than a magnitude of a corresponding acceleration noise.

In addition, the analyzing unit may extract a pitch angle and/or a roll angle, which correspond to a pose of the input device with respect to a bottom plane on which the input device is positioned, from acceleration data sampled during a period when the acceleration is measured and generates a warning signal to request the pose of the input device be corrected when the pitch angle and/or the roll angle deviates from predetermined angle ranges.

Still further, the apparatus may include a warning output unit to output a warning message to a user corresponding to the warning signal from the analyzing unit.

To achieve the above and/or other aspects and advantages, embodiments of the present invention include at least a one medium including computer readable code to implement a user interface method, the method including measuring acceleration of an input device while a gesture writing is performed, using the input device to generate acceleration signals, determining whether the input device is operated relative to a predetermined gesture range based on a time period when the gesture writing is made and/or based on the acceleration signals, and generating a warning when the input device deviates from the predetermined gesture range.

Here, the input device may be a gesture-recognition based input device.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A to 2D illustrate processes of collecting data through a gesture-recognition input device, such as that of FIG. 1, according to an embodiment of the present invention;

FIG. 3 illustrates an internal block diagram of a gesture-recognition based input device, such as that of FIG. 1, according to an embodiment of the present invention;

DETAILED DESCRIPTION OF THE PREFERRED EMBODIMENTS

Figure 1:
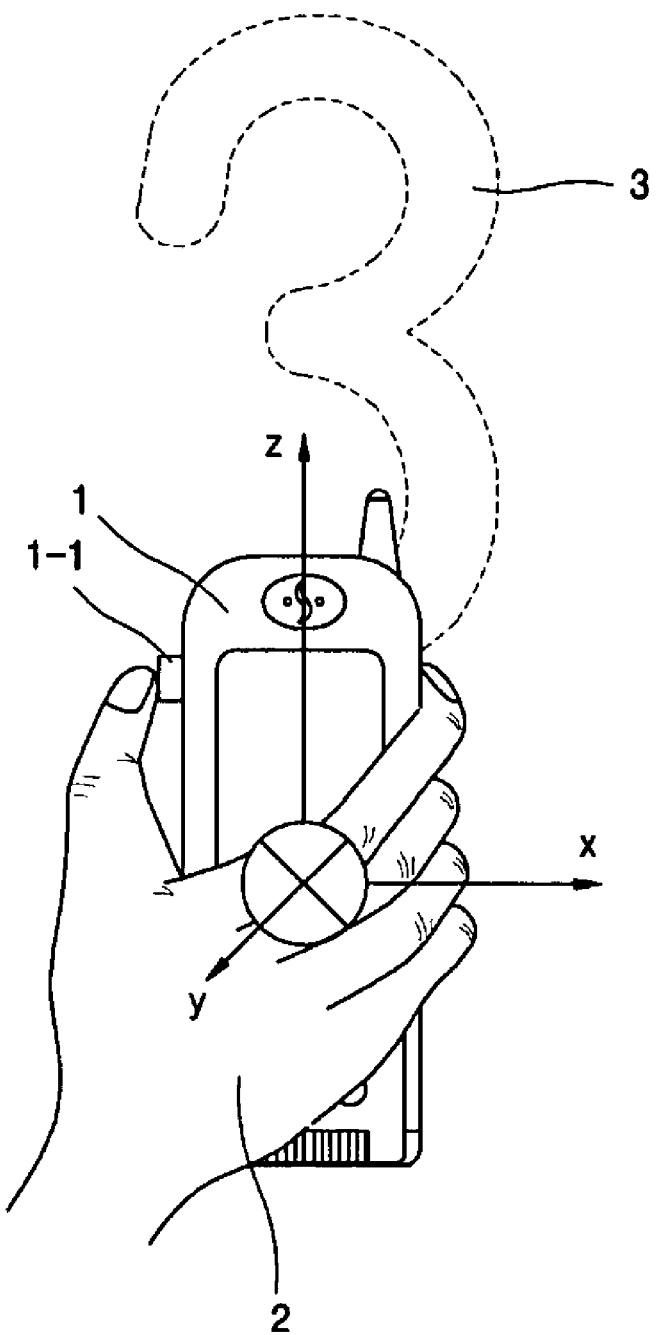
FIG. 1 illustrates a gesture-recognition based input device, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a gesture-recognition based input device 1, according to an embodiment of the present invention. Referring to FIG. 1, a user may hold the gesture-recognition based input device 1 (hereinafter, referred to as an input device) in his or her hand 2, for example, and write data 3 to be input, e.g., in the air, while pressing a button 1-1, according to an embodiment of the present invention. The input device 1 may sense a writing gesture of the user through a built-in sensor (not shown), for example. According to an embodiment of the present embodiment, the sensor, which may be a three-axis acceleration sensor, senses an acceleration of the input device 1 in x, y, and z directions, for example.

FIGS. 2A to 2D illustrate processes of collecting data through an input device 1, such as that of FIG. 1. In particular, FIG. 2A shows a period when the button 1-1 may be pushed. Referring to FIG. 2A, the button 1-1 can be pushed at time 20 and the button 1-1 can be released at time 21. Further, FIG. 2B shows a sampling period when data for sensing the gesture may be collected. Here, the sampling period may be the same as the period when the button 1-1 is pushed and acceleration signals are measured during the sampling period, according to an embodiment of the present invention.

FIG. 2C shows a period when a signal related to the actual writing gesture is extracted from the measured acceleration signals. Referring to FIG. 2C, since the gesture starts after the button 1-1 is pushed and the button 1-1 is released after the gesture is completed, a difference in time exists between the sampling period and the gesture period. Similarly, FIG. 2D shows an example of output signals of the three-axis acceleration sensor, where the writing gesture starts at a time 22 and the writing gesture is completed at a time 23.

FIG. 3 illustrates an internal block diagram of an input device 1, such as the input device 1 in FIG. 1. The shown input device 1 may include a sensor 30, an analyzing unit 31, a gesture recognizing unit 32, and a warning output unit 33. When the user performs the writing gesture while pressing the button 1-1 of the input device, the sensor 30 may sense acceleration signals. The analyzing unit 31 may then analyze the acceleration signals to determine whether the acceleration signals are valid. When it is determined that the acceleration signals are valid, that is, for example, when it is determined that the writing gesture has been made during the sampling period and that the button 1-1 has been continuously pushed during the sampling period, the gesture recognizing unit 32 may recognize the gesture, using sampled acceleration data. To recognize the writing gesture, feature vectors may be extracted from the acceleration signals measured by the sensor 30 and distances between the extracted feature vectors and previously stored sample feature vectors of various gestures may be calculated. As a result of the calculations, for example, the gesture corresponding to the sample feature vectors that are closest to the extracted characteristic acceleration may be recognized as the current gesture. According to another gesture recognizing method, for example, feature vectors are extracted from the acceleration signals measured by the sensor 30 and the extracted feature vectors are input to gesture models, which may have already been learned, e.g., stored, recorded, or taught, about various gestures. The gesture model that generates the highest probability value or score may be selected and the gesture corresponding to the selected gesture model is recognized as the current gesture, according to an embodiment of the present invention. Other gesture recognition methods can be equally applied without departing of the present invention.

When the analyzing unit 31 determines that the acceleration signals are not valid, the warning output unit 33 may output a warning message corresponding to the respective signals output from the analyzing unit 31, for example. The warning message may be provided in the form of a voice stating "Please pose the input device horizontally and re-input data," or "Data input is late," on display, or in the form of vibration, for example, noting that alternate embodiments are equally available.

Figure 4A:
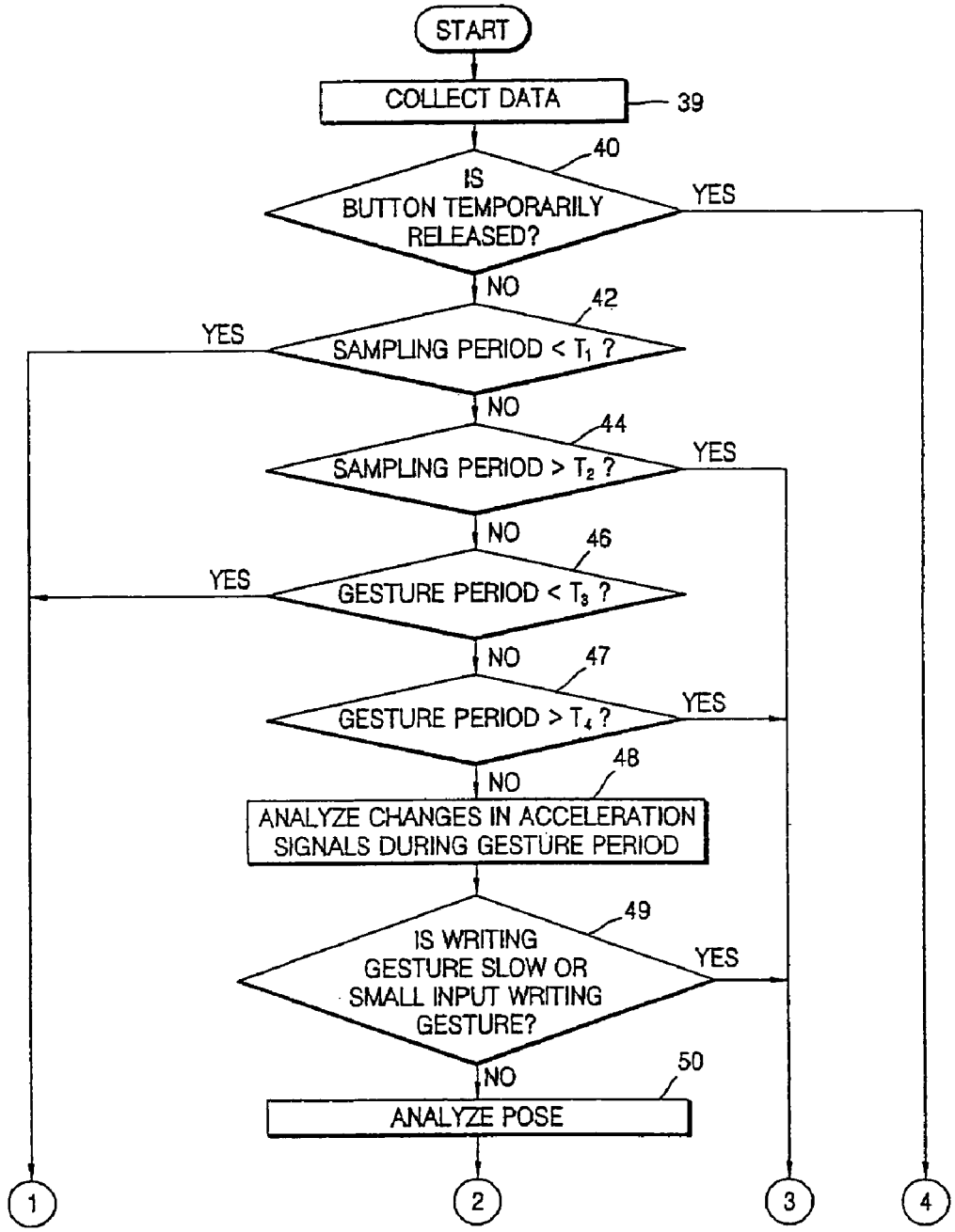
FIGS. 4A-4B illustrate a user interface method, according to an embodiment of the present invention.
Figure 4B:
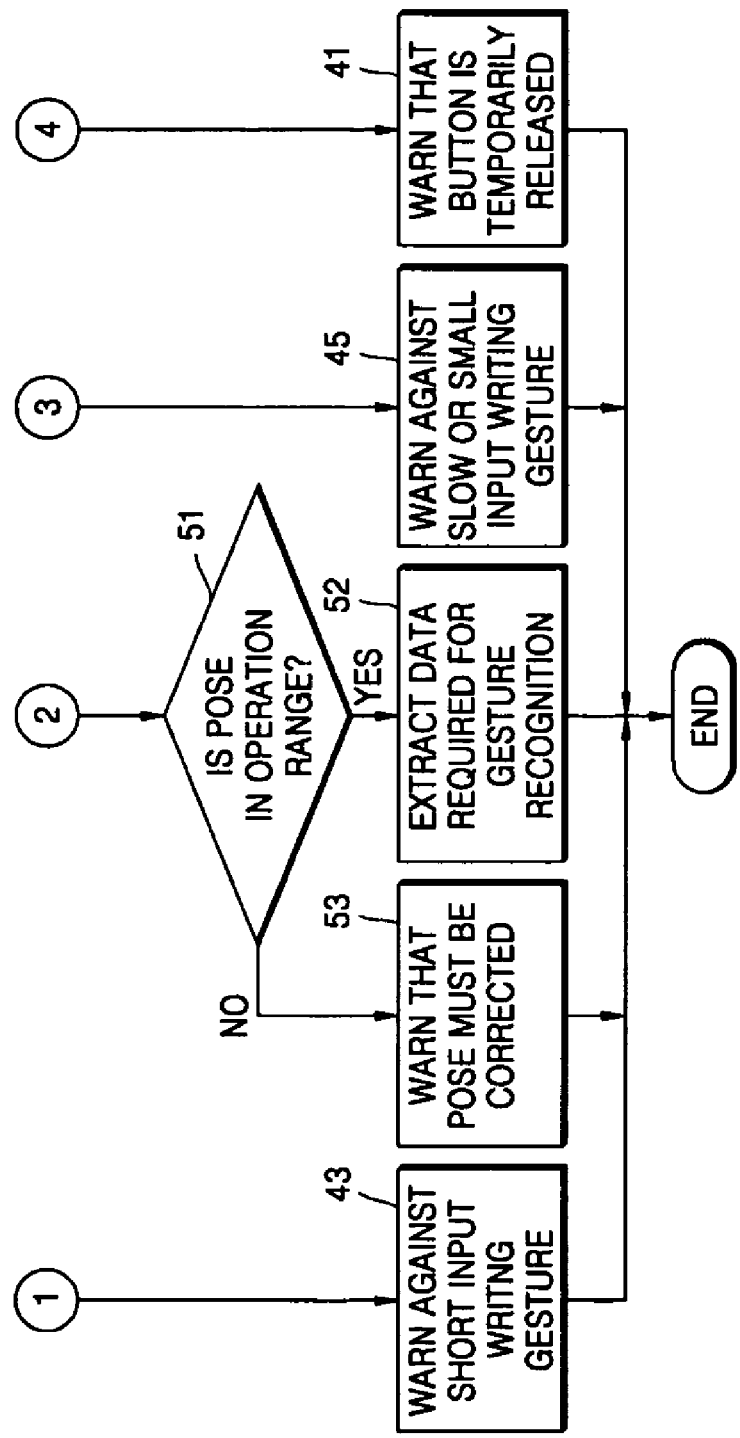

FIGS. 4A-4B illustrate operations of an analyzing unit 31, such as that of FIG. 3, for example. Referring to FIGS. 4A-4B, first, the user may make the writing gesture while pressing the button 1-1, and the sensor 30 may measure the acceleration caused by the writing gesture (operation 39). In an embodiment of the present invention, the button 1-1 may need to be continuously pressed while the writing gesture is made. The acceleration may be continuously measured for a time period $\Delta$ after the writing gesture is completed, that is, after the button 1-1 is released, for example. Therefore, when the button 1-1 is pushed again within the time period $\Delta$ after the button 1-1 is temporarily released, the analyzing unit 31 may determine that the button 1-1 was temporarily released when the writing gesture is performed (operation 40).

Figure 5:
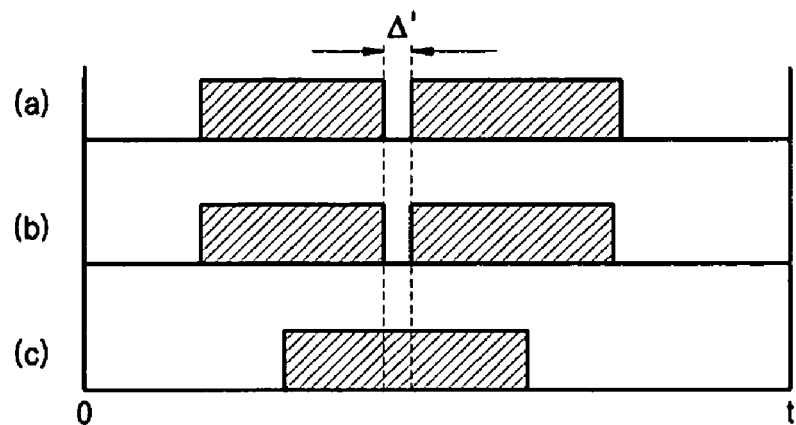
FIG. 5 illustrates an operation of the gesture-recognition based input device, such as by that of FIG. 1, when a button is temporarily released, according to an embodiment of the present invention.

FIG. 5 illustrates the operation of the input device 1 when the button 1-1 is temporarily released. Here, referring FIGS. 4A, 4B, and 5, as shown in illustration (a), in FIG. 5, when the button 1-1 is temporarily released for a time period $\Delta'(\Delta' \leq \Delta)$, the sampling period shown in illustration (b) also misses sampling data during the time period $\Delta'$. Illustration (c) shows a gesture period in a case where the user continuously makes the writing gesture without recognizing that the button 1-1 has been released. In an embodiment, the $\Delta$ is a value greater than an average of measured time gaps, which are time differences between the first and second button presses when subjects are required to press the button 1-1 consecutively twice.

According to an embodiment of the present embodiment, when the button 1-1 is temporarily released, the analyzing unit 31 may output a signal warning that the button 1-1 has been released to the warning output unit 33 (operation 41). The warning output unit 33 may then output a warning message to the user to let the user press the button 1-1 again.

When a writing gesture is made in a state where the button 1-1 is continuously pushed in the operation 40, it may be determined whether the sampling period is in a valid range, for example. That is, in this example, if the sampling period is less than a first threshold value T1 (operation 42), it may be any one of the cases that the writing gesture has been made quickly, the writing gesture has been stopped before completion, and the button 1-1 has been released in advance, for example. In other words, a short input gesture may have occurred such that insufficient data for a recognition has been collected. Therefore, the analyzing unit 31 may output a warning signal against the short input gesture to the warning output unit 33 (operation 43), for example.

According to an embodiment of the present invention, when the sampling period is greater than a second threshold value T2 (operation 44) (T2>T1, for example), the writing gesture corresponds to a slow or small input gesture, which means that the writing gesture was made slowly or the writing gesture was too small to be distinguished from a noise signal caused by the trembling of the hand, for example. Therefore, the analyzing unit 31 may output to the warning output unit 33 a warning signal against the slow or small gesture (operation 45), for example.

When the sampling period is between T1 and T2, the analyzing unit 31 may determine whether the gesture period is within a valid range. That is, when the gesture period is less than a third threshold value T3 (operation 46), the analyzing unit 31 may output to the warning output unit 33 a warning signal against the short input gesture (operation 43). Here, T3 may also be equal to T1. Since the sampling period would be greater than the gesture period, T1$\leq$T3, also as an example.

When the gesture period is greater than a fourth threshold value T4 (operation 47) (T4>T3, for example), the analyzing unit 31 may output to the warning output unit 33 a warning signal against the slow or small input gesture (operation 45). Here, T4 may be equal to T2, for example. Since the sampling period may also be greater than the gesture period, T2$\geq$T4, also as an example.

According to an embodiment of the present embodiment, where an experiment was implemented, 100 subjects repeatedly made 19 gestures including the numbers 0, 1, . . . , and 9, in order, to determine first through fourth threshold values T1–T4, with the total number of gesture attempts being 12,495. The third and fourth threshold values T3 and T4, here, are related to the gesture period and may be determined by measuring the gesture durations of the subjects.

Figure 6:
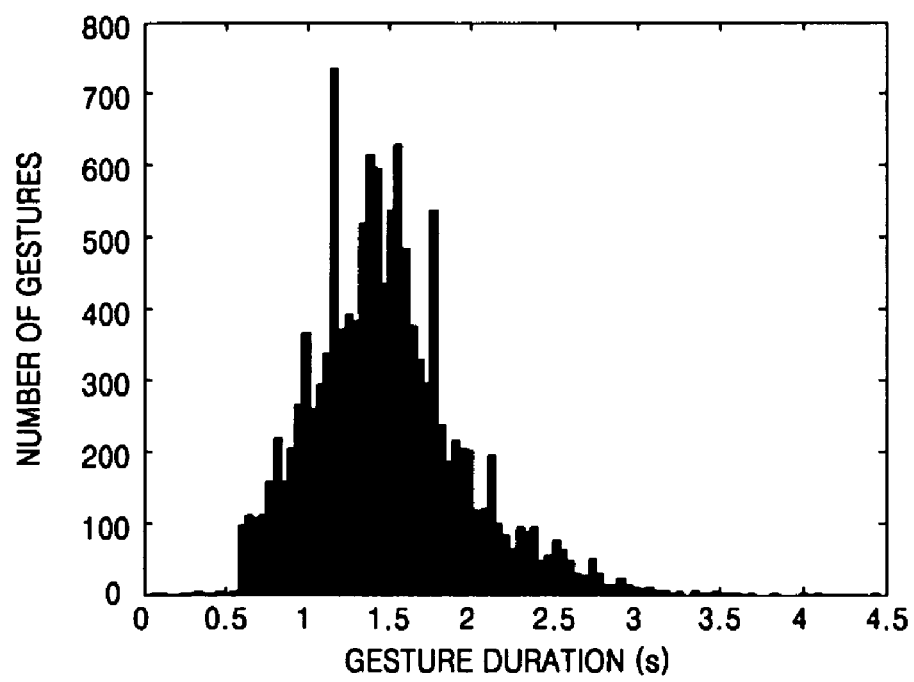
FIG. 6 illustrates a distribution of gesture durations and a number of gestures in accordance with an experimental result.

FIG. 6 shows a distribution of gesture durations with respect to a number of gestures, in accordance with these experimental results. Referring to FIG. 6, the minimum gesture duration was 0.7 seconds and the maximum gesture duration was 4.43 seconds. Therefore, in an embodiment of the present invention, the gesture period may be in the range of T3 equaling 0.4 second, and T4 equaling 5 seconds.

When the gesture period is determined, it may be possible to determine the sampling period from the gesture period. As described above, since the threshold values T1 and T2 of the sampling period should satisfy T1<T3 and T2>T4, respectively, according to an embodiment of the present invention, the sampling period may be in the range T1 equaling 0.4 second, and T2 equaling 8 seconds.

When both the sampling period and the gesture period are within a valid range, the analyzing unit 31 may analyze variances in the acceleration signals during the gesture period (operation 48). The analysis of the acceleration signals may be performed by detecting variances in the three-axis acceleration signals during the gesture period. To detect variances of the acceleration signals means detecting a plurality of parameters related to variances of the acceleration signals, for example. The parameters may include the below: AccVar, which may denote the maximum variance of the acceleration signals during the entire gesture period, AccVarWin, which denotes a maximum variance, for example, in a moving window of a predetermined size in the gesture period, MAccVarWin, which denotes a maximum value among the AccVarWin values, and AccVarSNR, which denotes a signal to noise ratio (SNR) of the measured acceleration. Here, AccVarSNR denotes a ratio of a magnitude of the acceleration signal due to an input gesture to acceleration noise caused by the hand trembling. As an example, these parameters can be described in the below Equations 1-4.

$$AccVar = \max[\sigma^2(f_x), \sigma^2(f_y), \sigma^2(f_z), \sigma^2(f_n)] \quad \text{Equation 1}$$

Here, $\sigma^2(f_x)$, $\sigma^2(f_y)$, $\sigma^2(f_z)$ and $\sigma^2(f_n)$ denote variances of accelerations along the x, y, and z axes, and variance of norm of the accelerations during a gesture period, respectively.

$$AccVarWin(\sigma_{win}^2) = AccVarWin(\sigma_{win}^2(f_x), \sigma_{win}^2(f_y), \sigma_{win}^2(f_n)) \quad \text{Equation 2}$$

Here, $\sigma_{win}^2(f_x)$, $\sigma_{win}^2(f_y)$, $\sigma_{win}^2(f_z)$ and $\sigma_{win}^2(f_n)$ denote variances of signals of x, y, and z axes, and variance of the norm of the accelerations that are included in respective moving windows, which can be represented by the following equation, respectively.

$$\sigma_{win}^2(f_x) = \{\sigma^2(f_{x1}), \ldots, \sigma^2(f_{xk}), \ldots, \sigma^2(f_{xm})\}$$

$$\sigma_{win}^2(f_y) = \{\sigma^2(f_{y1}), \ldots, \sigma^2(f_{yk}), \ldots, \sigma^2(f_{ym})\}$$

$$\sigma_{win}^2(f_z) = \{\sigma^2(f_{z1}), \ldots, \sigma^2(f_{zk}), \ldots, \sigma^2(f_{zm})\}$$

$$\sigma_{win}^2(f_n) = \{\sigma^2(f_{n1}), \ldots, \sigma^2(f_{nk}), \ldots, \sigma^2(f_{nm})\} \quad \text{Equation 3}$$

In addition, EAccVarWin, MAccVarWin, and AccVarSNR can be represented as follows.

$$EAccVarWin = \max\{\text{mean}\lfloor\sigma_{win}^2(f_x)\rfloor, \text{mean}\lfloor\sigma_{win}^2(f_y)\rfloor,$$
$$\text{mean}\lfloor\sigma_{win}^2(f_z)\rfloor, \text{mean}\lfloor\sigma_{win}^2(f_n)\rfloor\} \quad \text{Equation 4}$$

$$MAccVarWin = \max\{\max\lfloor\sigma_{win}^2(f_x)\rfloor, \max\lfloor\sigma_{win}^2(f_y)\rfloor,$$
$$\max\lfloor\sigma_{win}^2(f_z)\rfloor, \max\lfloor\sigma_{win}^2(f_n)\rfloor\}$$

$$AccVarSNR = \frac{AccVar}{EAccVarWin}$$

It may be determined whether a gesture is a slow or small writing gesture using variance parameters (operation 49), for example. A slow or small writing gesture may correspond to a case in which changes in the accelerations of the entire gesture period are less than a fifth threshold value $T_{accvar}$ or a case in which changes in accelerations during an entire gesture period are greater than the fifth threshold value, the maximum value of the variances of the accelerations detected in the moving windows in the gesture period is less than a sixth threshold value $T_{MAccVar}$, and the magnitude of the acceleration signal is less than the magnitude of the acceleration noise caused by the trembling of a user's hand, for example.

The above may be logically represented as $(AccVar < T_{accvar})$ or $[(MAccVarWin < T_{MAccVar})$ AND $(AccVar > T_{AccVar})$ AND $(AccVarSNR < T_{AccSNR})]$, for example. When the acceleration signal satisfies the above-described condition, the gesture may be determined to be a slow or small writing gesture, for example. Here, $T_{Accvar}$, which is the threshold value of AccVar, denotes a minimum value of AccVar used for detecting a gesture and $T_{AccVar}$ that is the threshold value of AccVar is greater than $T_{accvar}$. When AccVar is greater than $T_{AccVar}$, the gesture may be determined to be a normal gesture. Here, $T_{AccSNR}$ may be the threshold value of AccVarSNR and $T_{MAccVar}$ may be the threshold value of MAccVarWin. The threshold values can be experimentally determined, for example.

Figure 7A:
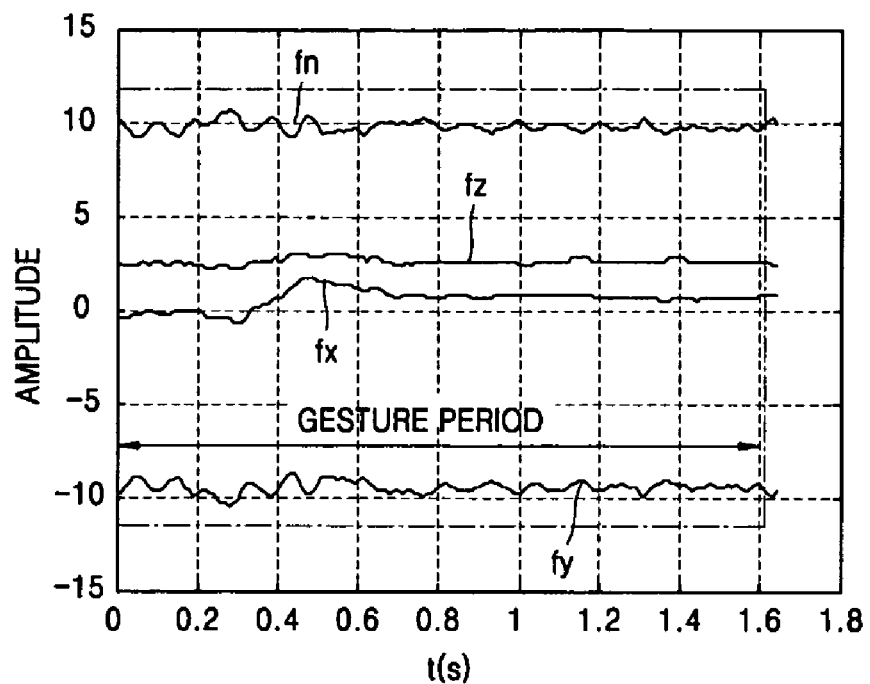
FIGS. 7A and 7B illustrate input acceleration signals where changes of variations are small during a sampling period and a gesture is determined to be a slow or small writing gesture and when a gesture is determined to be a valid gesture, respectively, according to an embodiment of the present invention.
Figure 7B:
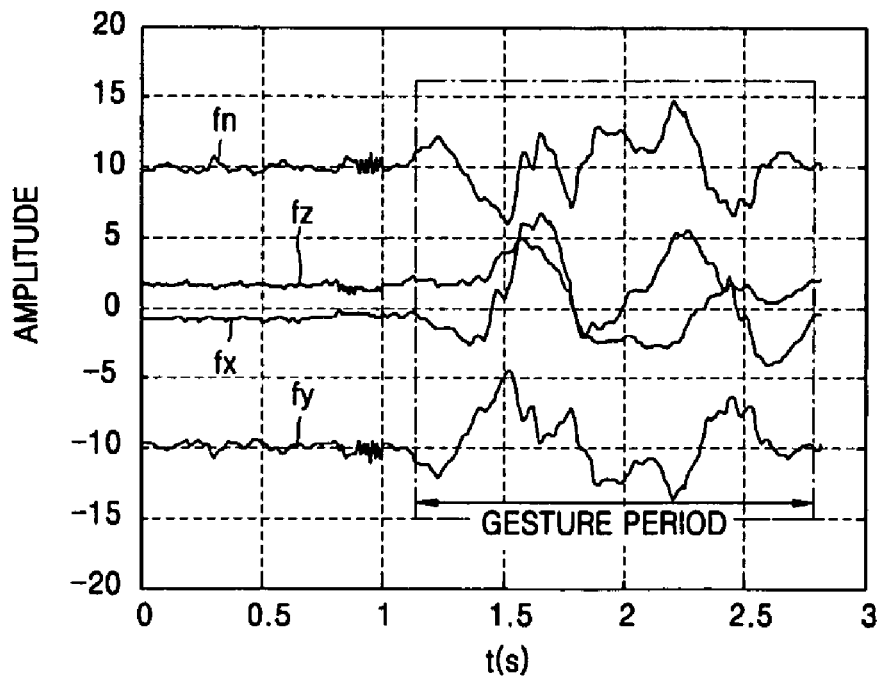

FIGS. 7A and 7B illustrates input acceleration signals where variations of variances are small during the sampling period and the gesture is determined to be a slow or small writing gesture and when the gesture is determined to be a valid gesture, respectively. In FIGS. 7A and 7B, fx, fy, fz, and fn denote accelerations along the x, y, and z axes and norm of the accelerations, respectively. It can be noted from FIG. 7A that difference in signal variations during the entire sampling period and during the gesture period is not large.

Figure 8A:
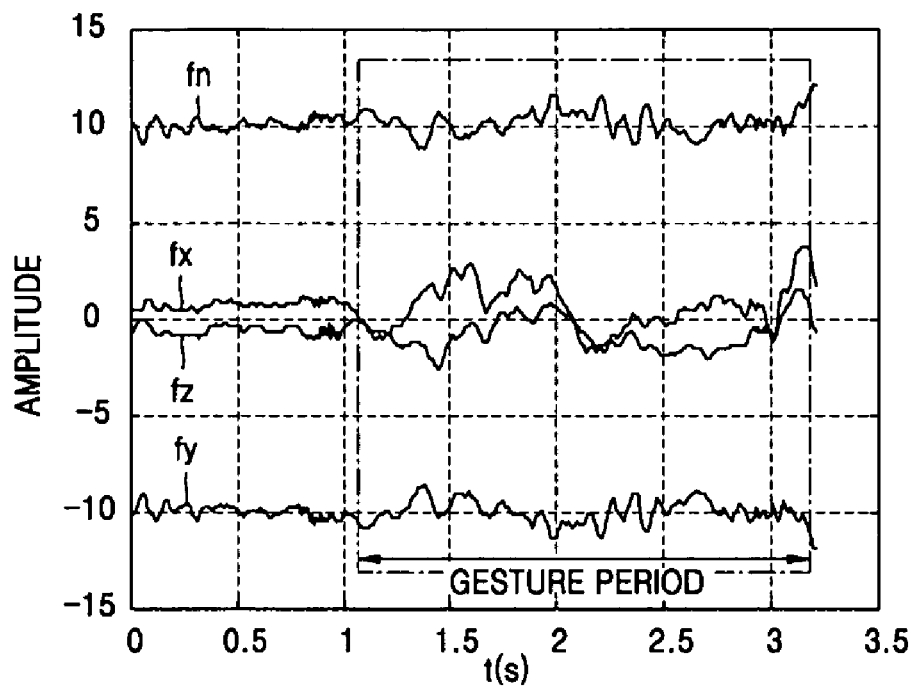
FIGS. 8A and 8B illustrate input acceleration signals where the SNRs of the signals are small during a sampling period and a gesture is determined to be a slow or small writing gesture and when a gesture is determined to be a valid gesture, respectively, according to an embodiment of the present invention.
Figure 8B:
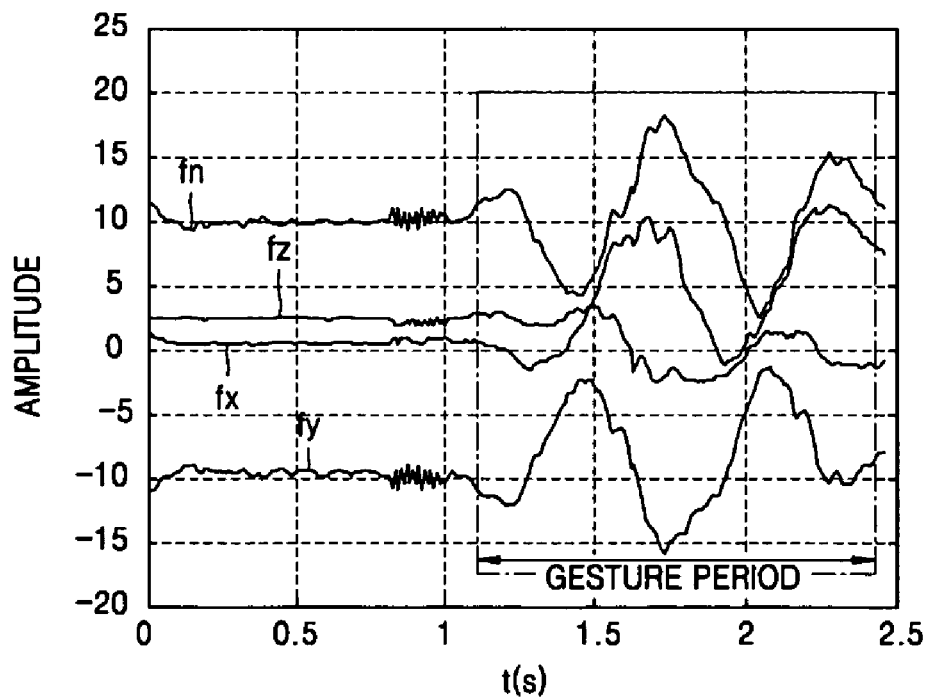

FIGS. 8A and 8B illustrate input acceleration signals where the SNRs of the signals are small during the sampling period and the gesture is determined to be a slow or small writing gesture, and when the gesture is determined to be a valid gesture, respectively. It can be noted from FIG. 8A that signal variations exist in the gesture period. However, the magnitudes of the variations are not large compared with those caused by a hand trembling, for example, prior to the gesture and the magnitudes of the variations are smaller than those obtained in the case shown in FIG. 8B.

When the gesture is determined to be a slow or small writing gesture, in operation 49, the analyzing unit 31 may output a warning signal against a slow or small writing gesture to the warning output unit 33 (operation 45).

Figure 11:
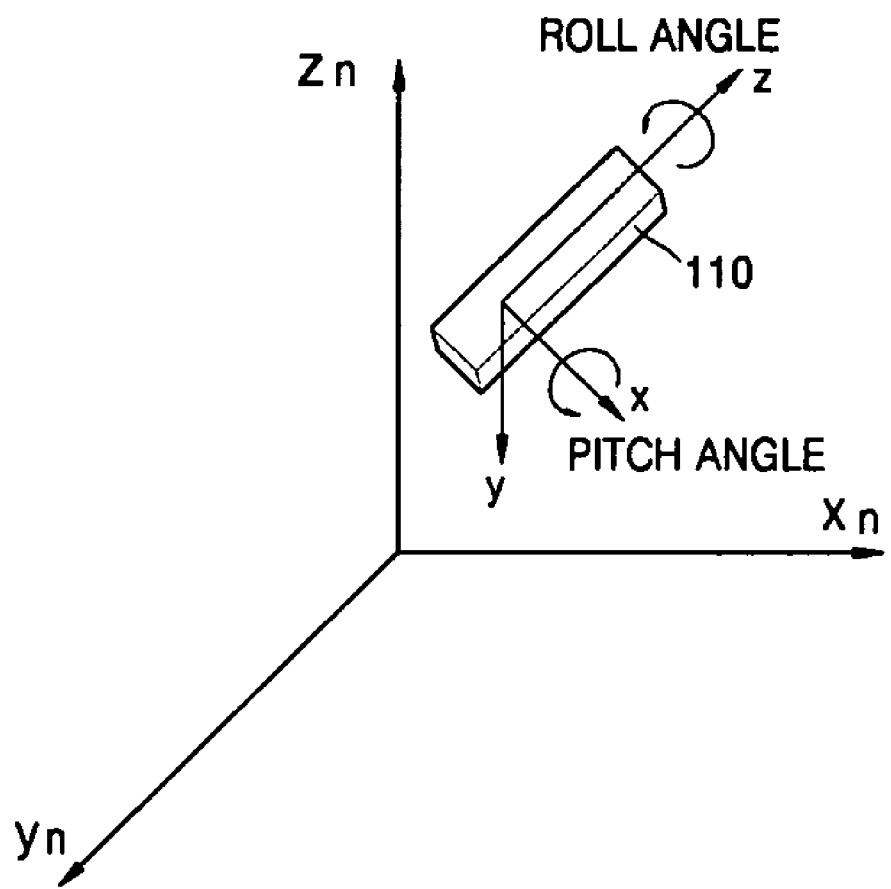
FIG. 11 illustrates a roll angle and a pitch angle of an object in a three-dimensional space.

When it is determined that signals, based on the writing gesture, are in the valid range, the analyzing unit 31 may analyze the pose of the input device 1 (operation 50). The pose of the input device 1 may be measured by determining the pitch angle and the roll angle of the input device 1, for example, which may be obtained from the three-axis acceleration signals based on the bottom plane on which the user is positioned. The roll angle and the pitch angle may be measured with respect to a vertical plane. FIG. 11 shows the roll angle and the pitch angle in the x, y, and z coordinates, and as shown in FIG. 11, the roll angle may be a rotation angle with respect to the z axis of a body 110 and the pitch angle may be a rotation angle with respect to the x axis of the body 110.

The pitch angle and the roll angle may be determined from the three-axis accelerations as follows.

$$\text{Roll Angle} = \tan^{-1}\left(\frac{\overline{f}_y}{\overline{f}_x}\right) \quad \text{Equation 5}$$

$$\text{Pitch Angle} = \tan^{-1}\left(\frac{\overline{f}_z}{\sqrt{\overline{f}_x^2 + \overline{f}_y^2}}\right)$$

Here, $$\bar{f}_x = \frac{1}{n}\sum_{i=1}^{n} f_x(i), \bar{f}_y = \frac{1}{n}\sum_{i=1}^{n} f_y(i), \bar{f}_z = \frac{1}{n}\sum_{i=1}^{n} f_z(i)$$

represents an average of data sampled during the gesture period.

Equation 5 may be used to calculate the pose of the input device 1 based on the ratios of the gravity components measured along the x, y, and z axes. While the user performs the writing gesture, acceleration caused by the writing gesture of the user as well as the acceleration of gravity may be measured. Therefore, it may be necessary to remove the acceleration caused by the writing gesture and extract the acceleration of gravity. In general, when the acceleration caused by the writing gesture of the user is integrated over the gesture period, the value added in the positive direction and the value added in the negative direction are offset to obtain a value close to 0. Therefore, in Equation 5, the average of the accelerations calculated for the respective axes may be considered to be the approximate value of the acceleration of gravity, to be used for calculating the pose of the input device 1. In other words, since the pose of the input device 1 is affected by the acceleration caused by the writing gesture, the effects of the acceleration caused by the writing gesture on the respective axes are offset to obtain a value close to 0 when Equation 5 is adopted. Therefore, it is possible to calculate the pose of the input device 1 without being affected by the writing gesture.

The allowable ranges of the pitch angle and the roll angle can be experimentally determined, for example, so that users can conveniently use the input device 1.

Figure 9:
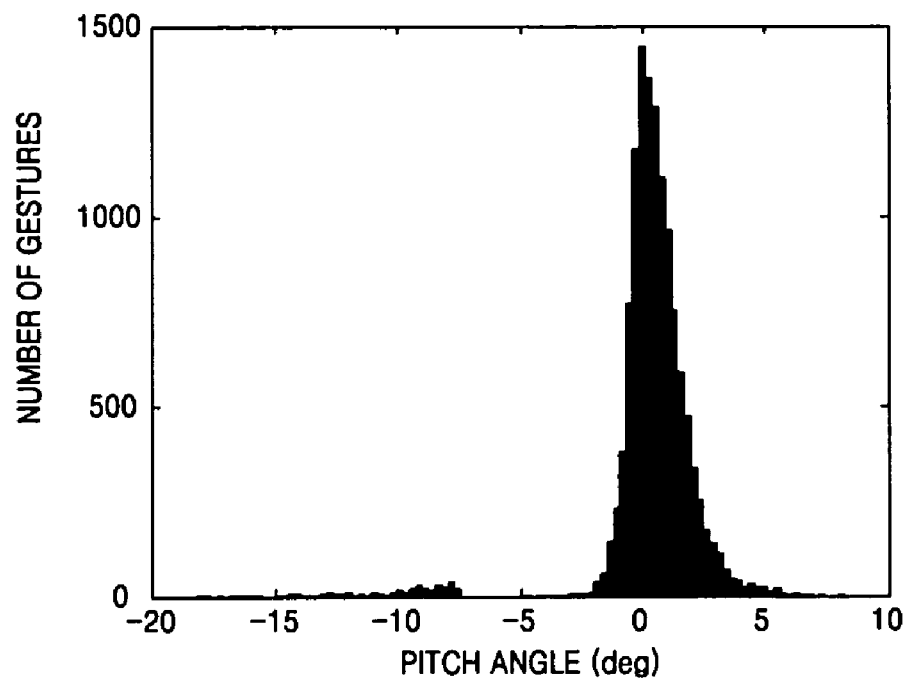
FIG. 9 illustrates a distribution of a number of gestures with respect to pitch angle.
Figure 10:
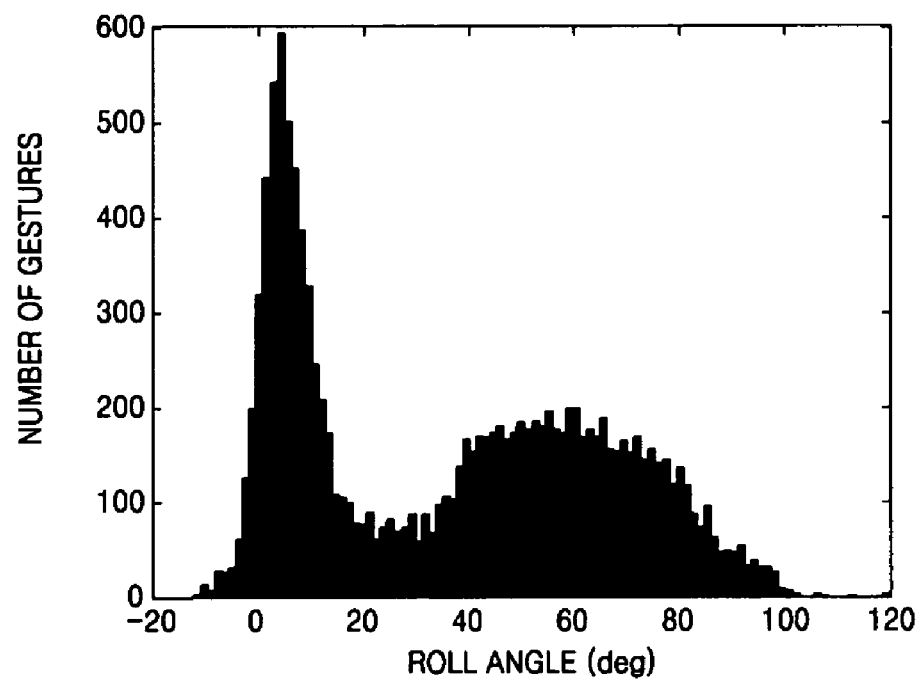
FIG. 10 illustrates a distribution of a number of gestures with respect to roll angle.

FIG. 9 illustrates a distribution of a number of gestures with respect to pitch angle, and FIG. 10 illustrates a distribution of a number of gestures with respect to roll angle. Referring to FIGS. 9 and 10, writing gestures may be mainly made when the pitch angle is in the range of [−5°, 5°] and when the roll angle is in the range of [−10°, 100°]. Therefore, according to an embodiment of the present embodiment, the allowable ranges of the pitch angle and the roll angle may be [−45°, 70°] and [−30°, 120°], respectively.

When the pitch angle or the roll angle deviates from the allowable ranges (operation 51), the analyzing unit 31 may output to the warning output unit 33 a warning signal(s) requiring that the pose of the input device 1 be corrected (operation 53), for example.

When the warning signal is output from the analyzing unit 31, the warning output unit 33 may inform the user of the warning message corresponding to the warning signal by voice or display, e.g., by displaying the warning message corresponding to the warning signal on the display of the input device 1, together with a warning sound, for example. Alternatively, the warning message may be delivered in the form of a vibration so that the user can sense the warning message by touching the input device 1, noting that alternative embodiments are equally available.

When the operation of the input device 1 is in the operation range, the analyzing unit 31 may extract data required for gesture recognition and output the extracted data to the gesture recognizing unit 32 (operation 52). The gesture recognizing unit 32 may then recognize the gesture of the user through a above-described processes.

Embodiments of the present invention may also be embodied as computer readable code on a medium, e.g., a computer readable recording medium. The medium may be any data storage device that can store data which can be thereafter read by a computer system, for example. Such media may include read-only memory (ROM), random-access memory (RAM), CD-ROMs, magnetic tapes, floppy disks, and optical data storage devices, for example, noting that alternative embodiments are equally available. The medium may also be distributed over network, e.g., through coupled computer systems, so that the computer readable code is stored and implemented in a distributed fashion.

Thus, according to an embodiment of the present invention, when a signal that is not appropriate for gesture recognition is detected, the corresponding signal may be removed before recognizing the gesture and a warning is sent to the user to immediately correct the gesture. Thus, it is possible to prevent resources from being wasted on analyzing an erroneous non-gesture signal. Also, it is possible to prevent a miss-operation of the input device caused by such erroneous data.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A user interface method, comprising:
measuring acceleration of an input device while a gesture writing is performed, using the input device to generate acceleration signals, wherein the gesture writing is performed while a button of the input device is activated;
determining whether the input device is operated relative to a predetermined gesture range based on a time period when the gesture writing is made and/or based on the acceleration signals;
generating a first warning or a second warning indicating that the input device has deviated from the predetermined gesture range when the input device deviates from the predetermined gesture range and outputting a first or second warning message corresponding to the first or second warning to a user; and
generating a third warning indicating that the button has been temporarily released from activation, when the button is deactivated and re-activated within a predetermined time during the gesture writing and outputting a third warning message corresponding to the third warning to the user,
wherein the first warning, second warning, and third warning are at least one of a verbal warning message, a displayed message on a display, and a form of vibration, and
wherein the button is separate from the display.

2. The user interface method of claim 1, wherein the input device is a gesture-recognition based input device.

3. The user interface method of claim 1, wherein, the predetermined gesture range indicates that a sampling period, which represents a period when the button is activated, is no less than a first threshold value and no greater than a second threshold value.

4. The user interface method of claim 3, wherein, the generating of the first warning indicates that the writing gesture was performed too quickly to record sufficient data for gesture recognition, when the sampling period is less than the first threshold value, and the generating of the second warning indicates that the writing gesture was made too slowly or too small to be distinguished from noise signals, when the sampling period is greater than the second threshold value.

5. The user interface method of claim 1, wherein, the predetermined gesture range indicates that a gesture period, which represents a period when corresponding acceleration is measured, is no less than a first threshold value and no greater than a second threshold value.

6. The user interface method of claim 5, wherein, the generating of the first warning indicates that the gesture writing was performed too quickly to record sufficient data for gesture recognition, when the gesture period is less than the first threshold value, and the generating of the second warning indicates that the gesture writing was made too slowly or too small to be distinguished from noise signals, when the gesture period is greater than the second threshold value.

7. The user interface method of claim 5, wherein, when a maximum value of variances of the acceleration signals is less than a third threshold value during the gesture period or when a maximum value of acceleration variances detected by a moving window during the gesture period is less than a fourth threshold value, and the magnitudes of the acceleration signals are less than a magnitude of acceleration noise, the gesture writing is outside of the predetermined range.

8. The user interface method of claim 7, wherein, the input device generates the second warning indicating the slow or small input gesture was made too slowly or too small to be distinguished from noise signals, when the gesture period is greater than the second threshold value.

9. The user interface method of claim 1, wherein, the predetermined gesture range indicates that a pitch angle and/or a roll angle, which correspond to a pose of the input device with respect to a bottom plane on which the input device is positioned, are in predetermined angle ranges.

10. The user interface method of claim 9, wherein the pitch angle and/or the roll angle are measured from an average of three-axis acceleration data sampled during a period when corresponding acceleration is measured.

11. The user interface method as claimed in claim 9, wherein, when the pitch angle and/or the roll angle deviates from the angle ranges, a fourth warning signal is generated to request the pose of the gesture-recognition based input device be corrected.

12. A user interface apparatus for an input device to recognize a gesture writing, the apparatus comprising:
a sensor to measure acceleration of the gesture writing to generate an acceleration signal;
an analyzing unit to determine whether the input device is operated within a predetermined gesture range, based on a period when the writing gesture is made or the acceleration signal, and to generate a first or a second warning signal indicating that the input device has deviated from the predetermined gesture range when the input device is operated outside of the predetermined gesture range and output a first or second warning message corresponding to the first or second warning to a user; and
a button continuously activated when the gesture writing is made,
wherein the analyzing unit outputs a third warning signal indicating that the button has temporarily been released, when the button is deactivated and re-activated within a predetermined time during the gesture period and output a third warning message corresponding to the third warning to the user, and
wherein the first warning, second warning, and third warning are at least one of a verbal warning message, a displayed message on a display, and a form of vibration, and
wherein the button is separate from the display.

13. The user interface apparatus of claim 12, wherein the input device is a gesture-recognition based input device.

14. The user interface apparatus of claim 12, wherein the analyzing unit outputs the first warning signal indicating that the input gesture was performed too quickly to record sufficient data for gesture recognition when a sampling period, which represents a period when the button is activated, is less than a first threshold value, and outputs the second warning signal indicating the input gesture was made too slowly or too small to be distinguished from noise signals when the sampling period is greater than a second threshold value.

15. The user interface apparatus of claim 12, wherein the analyzing unit outputs the first warning signal indicating that the input gesture was performed too quickly to record sufficient data for gesture recognition when a gesture period, which is a period when the acceleration is measured to be less than a first threshold value, and outputs the second warning signal indicating the input gesture was made too slowly or too small to be distinguished from noise signals when the gesture period is greater than a second threshold value.

16. The user interface apparatus of claim 15, wherein the analyzing unit outputs the second warning signal against the slow or small input gesture writing when a maximum value of variances of acceleration signals during the gesture period is less than a third threshold value or a maximum value of acceleration variances, detected by a moving window in the gesture period, is less than a fourth threshold value and the magnitudes of the acceleration signals during the gesture period are less than a magnitude of a corresponding acceleration noise.

17. The user interface apparatus of claim 12, wherein the analyzing unit extracts a pitch angle and/or a roll angle, which correspond to a pose of the input device with respect to a bottom plane on which the input device is positioned, from acceleration data sampled during a period when the acceleration is measured and generates a fourth warning signal to request the pose of the input device be corrected when the pitch angle and/or the roll angle deviates from predetermined angle ranges.

18. The user interface apparatus of claim 12, further comprising a warning output unit to output a warning message to a user corresponding to the first or second warning signal from the analyzing unit.

19. At least one non-transitory computer readable storage medium comprising computer readable code to implement a user interface method, the method comprising:
measuring acceleration of an input device while a gesture writing is performed, using the input device to generate acceleration signals, wherein the gesture writing is performed while a button of the input device is activated;
determining whether the input device is operated relative to a predetermined gesture range based on a time period when the gesture writing is made and/or based on the acceleration signals; and
generating a first warning or second warning indicating that the input device has deviated from the predetermined gesture range when the input device deviates from the predetermined gesture range and outputting a first or second warning message corresponding to the first or second warning to a user; and
generating a third warning indicating that the button has been temporarily released from activation, when the button is deactivated and re-activated within a predetermined time during the gesture writing and outputting a third warning message corresponding to the third warning to the user,
wherein the first warning, second warning, and third warning are at least one of a verbal warning message, a displayed message on a display, and a form of vibration, and
wherein the button is separate from the display.

20. The at least one non-transitory computer readable storage medium of claim 19, wherein the input device is a gesture-recognition based input device.

* * * * *